(12) United States Patent
Usami

(10) Patent No.: US 10,354,619 B2
(45) Date of Patent: Jul. 16, 2019

(54) INFORMATION DISPLAY SYSTEM

(71) Applicant: FUJIFILM Corporation, Tokyo (JP)

(72) Inventor: Yoshihisa Usami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 6 days.

(21) Appl. No.: 15/828,570

(22) Filed: Dec. 1, 2017

(65) Prior Publication Data
US 2018/0090107 A1 Mar. 29, 2018

Related U.S. Application Data

(63) Continuation of application No. PCT/JP2016/063019, filed on Apr. 26, 2016.

(30) Foreign Application Priority Data

Jun. 3, 2015 (JP) ................................. 2015-113057

(51) Int. Cl.
*G09G 5/00* (2006.01)
*G09G 5/22* (2006.01)
(Continued)

(52) U.S. Cl.
CPC ............. *G09G 5/22* (2013.01); *G06F 3/147* (2013.01); *G06K 19/077* (2013.01); *G09F 3/00* (2013.01);
(Continued)

(58) Field of Classification Search
CPC .. G06K 19/00; G06K 7/00; G09F 3/00; G09F 9/00; G09G 5/00; G06Q 10/08; B29C 49/78
See application file for complete search history.

(56) References Cited

U.S. PATENT DOCUMENTS 7,551,165 B2* 6/2009 Goodman ............ G06Q 10/087
345/204
2006/0197724 A1* 9/2006 Sakai .................... G09G 3/2096
345/87
(Continued)

FOREIGN PATENT DOCUMENTS

JP 2007-066143 A 3/2007
JP 2008-117154 A 5/2008
JP 2014-102401 A 6/2014

OTHER PUBLICATIONS

International Search Report issued in PCT/JP2016/063019; dated Jul. 5, 2016.
(Continued)

*Primary Examiner* — Pegeman Karimi
(74) *Attorney, Agent, or Firm* — Studebaker & Brackett PC

(57) ABSTRACT

An information display system comprising a tag including a signal receiver, an image-memory-type display medium that displays a display image based on an image display signal, and a storage including a first storage region for storing identification information and the image display signal and a second storage region for storing recording information indicating a storage state of the image display signal in the first storage region; and a reader/writer including a contact electrode unit that contacts the signal receiver, an information recognition unit that reads the identification information and the recording information, a memory that stores image display information corresponding to the identification information and identification information, and a writing unit that transmits an image display signal based on the image display information and a write signal for changing the recording information to indicate that the image display signal has been stored through the contact electrode unit.

8 Claims, 5 Drawing Sheets

(51) Int. Cl.
*G06K 19/077* (2006.01)
*G09F 3/00* (2006.01)
*G09G 3/34* (2006.01)
*G06F 3/147* (2006.01)
*G09G 5/393* (2006.01)

(52) U.S. Cl.
CPC ............... *G09G 3/34* (2013.01); *G09G 5/003* (2013.01); *G09G 5/393* (2013.01); *G09G 2330/021* (2013.01); *G09G 2370/04* (2013.01); *G09G 2370/18* (2013.01); *G09G 2380/04* (2013.01); *G09G 2380/08* (2013.01)

(56) References Cited

U.S. PATENT DOCUMENTS

| | | | | |
|---|---|---|---|---|
| 2010/0076872 | A1* | 3/2010 | Nakamura | G06Q 10/08 705/28 |
| 2014/0139500 | A1* | 5/2014 | Kimura | G09G 5/12 345/204 |
| 2014/0245045 | A1* | 8/2014 | Haruki | G06F 1/329 713/323 |
| 2016/0275880 | A1* | 9/2016 | Chen | G09G 5/003 |

OTHER PUBLICATIONS

Written Opinion of the International Searching Authority issued in PCT/JP2016/063019; dated Jul. 5, 2016.
An Office Action, "Notification of Reasons for Refusal" issued by the Japanese Patent Office dated May 15, 2018, which corresponds to Japanese Patent Application No. 2017-521743 and is related to U.S. Appl. No. 15/828,570; with English translation.

* cited by examiner

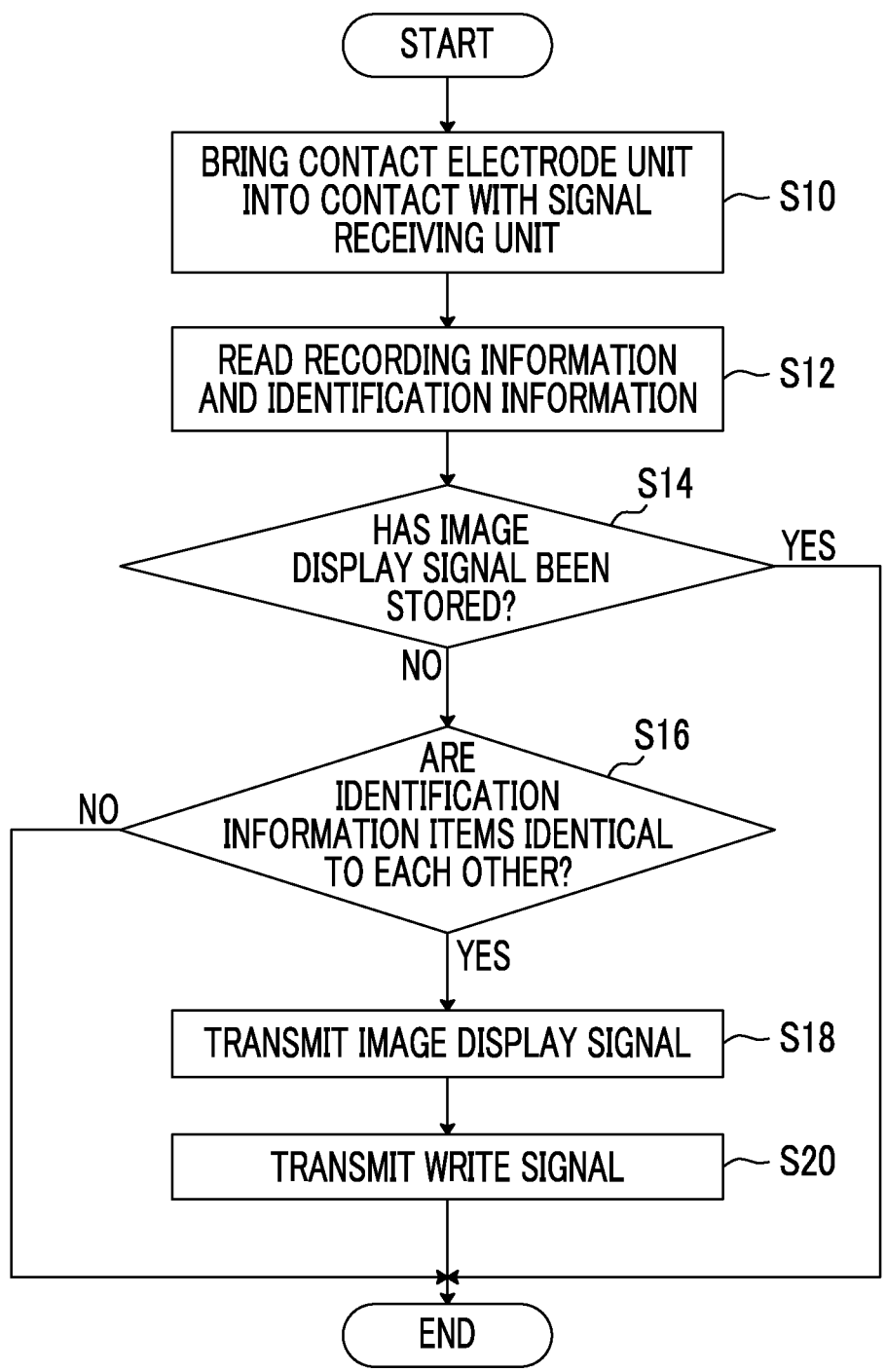

INFORMATION DISPLAY SYSTEM

CROSS-REFERENCE TO RELATED APPLICATIONS

This application is a Continuation of PCT International Application No. PCT/JP2016/063019 filed on Apr. 26, 2016, which claims priority under 35 U.S.C. § 119(a) to Japanese Patent Application No. 2015-113057 filed on Jun. 3, 2015. The above application is hereby expressly incorporated by reference, in its entirety, into the present application.

BACKGROUND OF THE INVENTION

1. Field of the Invention

The present invention relates to an information display system using a tag including an image-memory-type display medium, such as an electronic paper, and more particularly, to an information display system that transmits an image display signal to the image-memory-type display medium in a contact manner and can prevent an error in display on the image-memory-type display medium.

2. Description of the Related Art

In the related art, for example, the name and price of an article are written to a tag by hand. In addition, in a case in which a medicine is administered to a patient in the hospital, a tag is attached to medicines used for each patient. In a case in which a medicine is administered, the name of the patient is written to the tag by hand. In recent years, an electronic paper has been used as the tag. A system has been proposed which writes information to a tag, without handwriting.

JP2014-102401A discloses an information processing apparatus including a control device and a display device. The display device includes an electronic paper unit and a first storage unit that stores identification information allocated to each display device. The electronic paper unit is a display recording medium to which an image can be rewritten and which can display and retain an image, without being supplied with power.

The control device includes: a detection unit that detects the attachment and detachment of a display device having an electronic paper; a process control unit that, in a case in which the detachment of the display device is detected, writes, to a second storage unit, the identification information allocated to each display device and process information indicating the state of a process for processing content displayed on the display device so as to be associated with each other; and an acquisition unit that acquires the identification information in a case in which the attachment of the display device is detected. The process control unit acquires, on the basis of the acquired identification information, process information corresponding to the identification information acquired from the second storage unit, and changes the process to an execution state in a case in which the display device has been detached, on the basis of the acquired process information.

SUMMARY OF THE INVENTION

In a case in which a tag is written by hand, there is a problem that a mistake in writing occurs. In this case, for example, the name and price of an article are incorrectly displayed. In a case in which the name of a user is written to a tag provided in a medicine, when the name is incorrectly written, the medicine is likely to be incorrectly administered.

In addition, an image can be rewritten to the electronic paper unit of the information processing apparatus disclosed in JP2014-102401A. An image is likely to be written to the same electronic paper unit two times. In this case, the content of the image written by the second writing operation is displayed or the images written by the first and second writing operations are likely to be mixed and displayed. In both cases, an error in display occurs.

The invention has been made in order to solve the problems of the related art and an object of the invention is to provide an information display system that can prevent an error in display on an image-memory-type display medium.

In order to achieve the object, an aspect of the invention provides an information display system comprising: a tag comprising a signal receiving unit, an image-memory-type display medium that displays a display image on the basis of an image display signal, and a storage unit including a first storage region in which identification information and the image display signal are stored and a second storage region in which recording information indicating a storage state of the image display signal in the first storage region is stored; and a reader/writer comprising a contact electrode unit that comes into contact with the signal receiving unit, an information recognition unit that reads the identification information and the recording information, a memory that stores image display information corresponding to the identification information and identification information, and a writing unit that transmits an image display signal based on the image display information and a write signal for changing the recording information to indicate that the image display signal has been stored through the contact electrode unit. In a case in which the contact electrode unit of the reader/writer comes into contact with the signal receiving unit of the tag, the reader/writer reads at least the recording information of the identification information and the recording information. In a case in which the image display signal has not been stored, the reader/writer compares the identification information read by the information recognition unit with the identification information stored in the memory. In a case in which the identification information read by the information recognition unit is identical to the identification information stored in the memory, the writing unit transmits the image display signal based on the image display information corresponding to the identification information stored in the memory through the contact electrode unit such that the display image is displayed on the image-memory-type display medium and transmits the write signal.

Preferably, the first storage region of the storage unit of the tag is capable of storing the image display signal for the display image only once. Preferably, the storage unit of the tag is non-volatile.

Preferably, the image-memory-type display medium is supplied with power from the reader/writer and displays the display image and the reader/writer includes a power supply unit that supplies power to the image-memory-type display medium.

According to the invention, it is possible to prevent an error in display on the image-memory-type display medium.

BRIEF DESCRIPTION OF THE DRAWINGS

FIG. 8 is a flowchart illustrating the flow of an example of a display image writing process performed by the information display system according to the embodiment of the invention.

DESCRIPTION OF THE PREFERRED EMBODIMENTS

Hereinafter, an information display system according to the invention will be described in detail on the basis of a preferred embodiment illustrated in the accompanying drawings.

Figure 1:
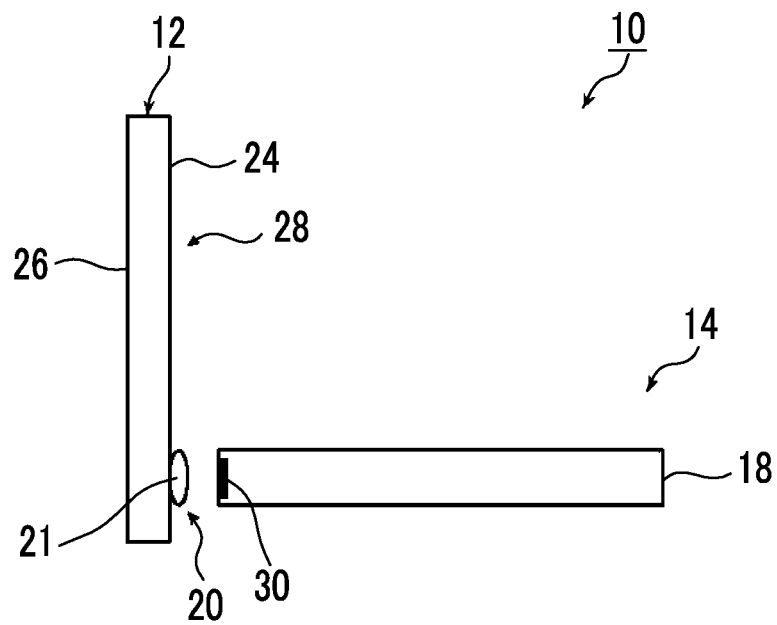
FIG. 1 is a diagram schematically illustrating an information display system according to an embodiment of the invention.
Figure 2:
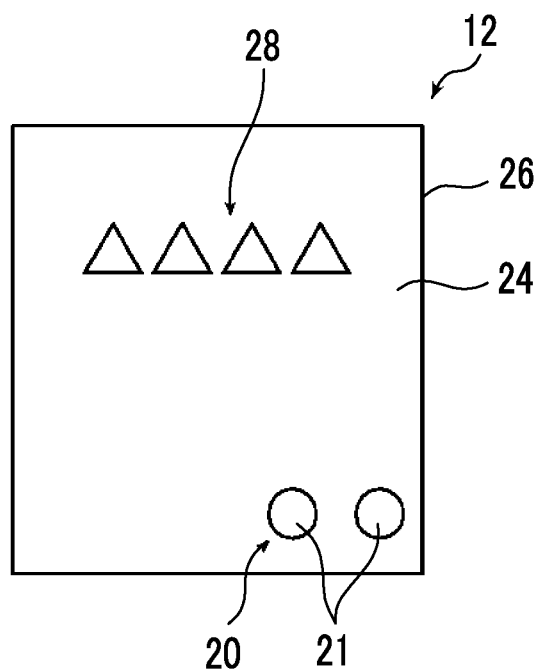
FIG. 2 is a diagram schematically illustrating a tag of the information display system according to the embodiment of the invention.
Figure 3:
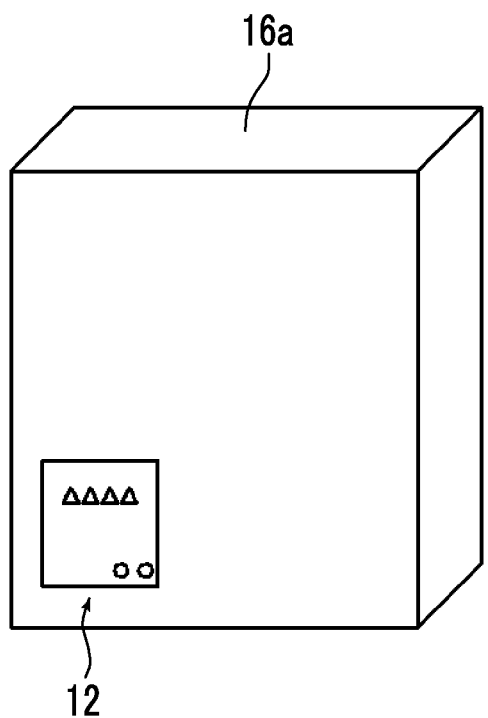
FIG. 3 is a perspective view schematically illustrating a first example of the usage of the tag.
Figure 4:
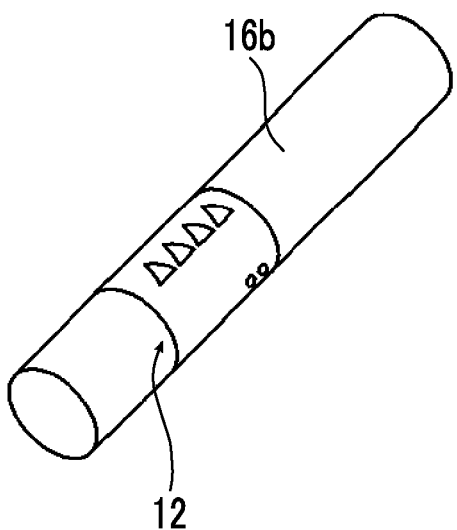
FIG. 4 is a perspective view schematically illustrating a second example of the usage of the tag.
Figure 5:
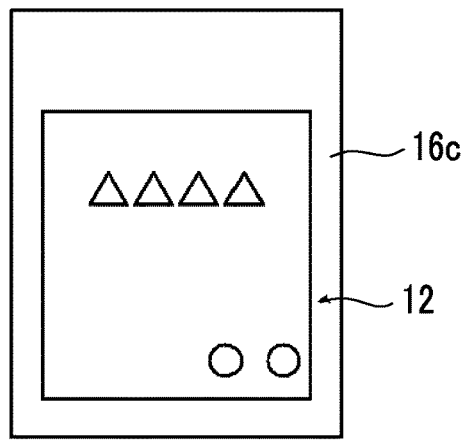
FIG. 5 is a plan view schematically illustrating a third example of the usage of the tag.

FIG. 1 is a diagram schematically illustrating an information display system according to an embodiment of the invention. FIG. 2 is a diagram schematically illustrating a tag of the information display system according to the embodiment of the invention. FIG. 3 is a perspective view schematically illustrating a first example of the usage of the tag. FIG. 4 is a perspective view schematically illustrating a second example of the usage of the tag. FIG. 5 is a perspective view schematically illustrating a third example of the usage of the tag.

As illustrated in FIG. 1, an information display system 10 includes a tag 12 and a reader/writer 14.

The tag 12 indicates the information of an object to which the tag 12 is attached. The tag 12 is attached to the object and is used. The tag 12 stores identification information.

As illustrated in FIG. 3, for example, the tag 12 is attached to a container 16a and is used. The container 16a is filled with gas, liquid, solid, or a mixture of at least two of them. For example, the container 16a is an infusion bag.

As illustrated in FIG. 4, the tag 12 is attached to a cylindrical container 16b and is used. The cylindrical container 16b is filled with gas, liquid, solid, or a mixture of at least two of them. For example, the cylindrical container 16b is a prefilled syringe.

As illustrated in FIG. 5, the tag 12 is attached to a film-shaped or flat-plate-shaped sheet 16c and is used as a price tag or an article tag. For example, the tag 12 can be used for a ticket and a coupon, in addition to the price tag and the article tag.

The tag 12 illustrated in FIGS. 1 and 2 includes a signal receiving unit 20 and an image-memory-type display medium 24 which are provided in a sheet body 26.

The signal receiving unit 20 is used to supply an image display signal to the image-memory-type display medium 24. The signal receiving unit 20 includes, for example, two electrodes 21.

The reader/writer 14 reads the identification information stored in the image-memory-type display medium 24. In a case in which the identification information is stored so as to be associated with the object having the tag 12 attached thereto, the object having the tag 12 attached thereto is specified. That is, it is specified where the tag 12 is attached.

Figure 6:
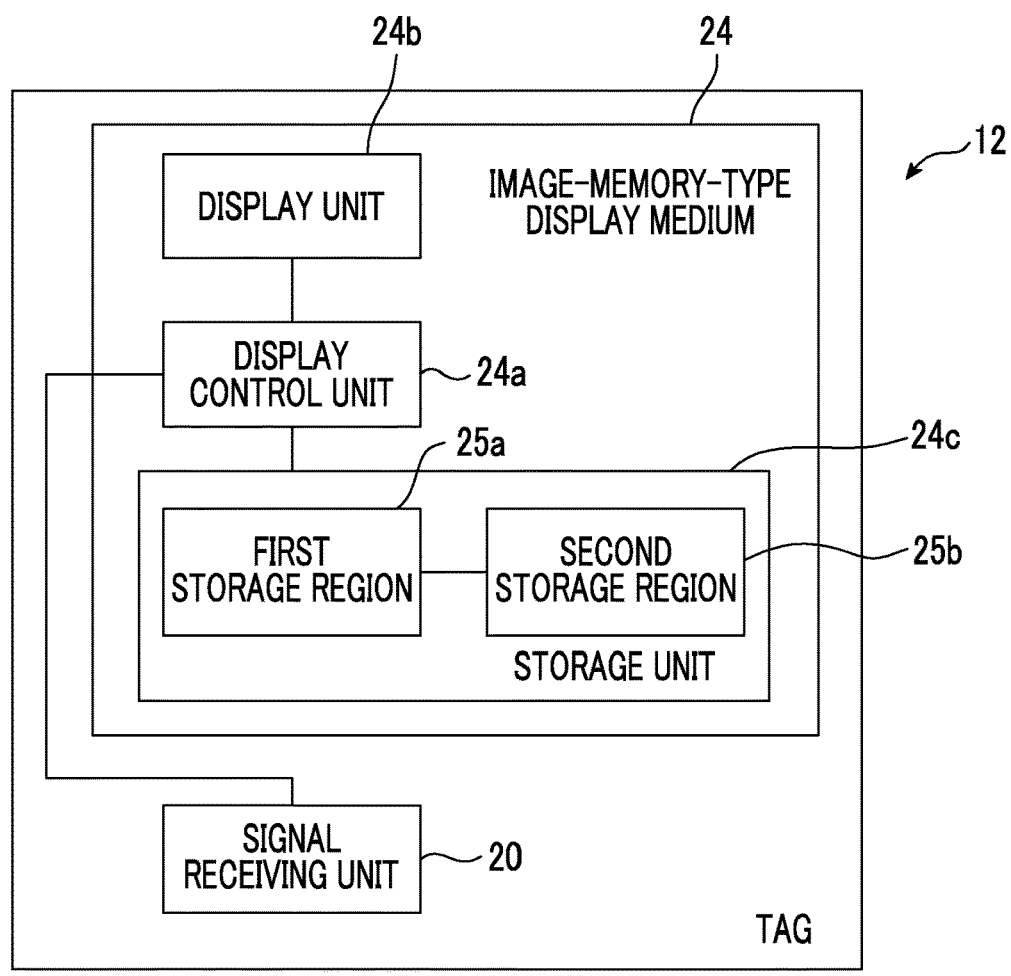
FIG. 6 is a block diagram illustrating the configuration of the tag of the information display system according to the embodiment of the invention.

FIG. 6 is a block diagram illustrating the configuration of the tag in the information display system according to the embodiment of the invention.

The image-memory-type display medium 24 displays a display image 28 (see FIG. 2) on the basis of an image display signal and has a memory function of retaining the display image 28 that has been displayed once.

As illustrated in FIG. 6, the image-memory-type display medium 24 includes a display control unit 24a, a display unit 24b, and a storage unit 24c. The display unit 24b displays the display image 28.

The image-memory-type display medium 24 is, for example, an electronic paper. The display control unit 24a includes, for example, a driving circuit (not illustrated) that includes a thin film transistor and is used to display the display image 28 on the display unit 24b on the basis of the image display signal.

The display control unit 24a is connected to the signal receiving unit 20 and is supplied with an image display signal through the signal receiving unit 20.

The storage unit 24c includes a first storage region 25a and a second storage region 25b. In the storage unit 24c, the identification information of the tag 12 and an image display signal for displaying the display image 28 are stored in the first storage region 25a. The identification information of the tag 12 is assigned to each tag 12 and is individual identification information for specifying each tag 12. The data configuration of the identification information is not particularly limited as long as the identification information can specify the tag 12.

The storage unit 24c is divided into the first storage region 25a and the second storage region 25b. However, the invention is not limited thereto. The storage unit 24c may have one storage region.

It is preferable that both the first storage region 25a and the second storage region 25b can store and retain information even in a case in which no power is supplied. Therefore, it is preferable that the first storage region 25a and the second storage region 25b are non-volatile. Here, the term "non-volatility" means that, even in a case in which no power is supplied, the stored information is retained. In a case in which the storage regions are non-volatile, it is possible to continuously display the display image 28 even though no power is supplied.

For example, recording information that indicates a storage state indicating whether the image display signal has been stored in the first storage region 25a is stored in the second storage region 25b. The recording information indicating the storage state of the image display signal in the first storage region 25a is simply referred to as recording information.

Here, the display control unit 24a controls the storage of information in the storage unit 24c. The display control unit 24a can store the above-mentioned information in the first storage region 25a and the second storage region 25b of the storage unit 24c.

The identification information stored in the first storage region 25a may be stored in advance or may be stored later. In a case in which the identification information is stored in advance, the identification information is fixedly set as hardware in the first storage region 25a, using a mask pattern, when the storage unit 24c is formed.

In a case in which the identification information is stored later, for example, a signal indicating the identification information is transmitted and stored in the first storage region 25*a* by the reader/writer 14.

For the image display signal, for example, the image display signal is transmitted and stored in the first storage region 25*a* by the reader/writer 14.

As described above, the recording information is stored in the second storage region 25*b*. For the recording information, specifically, in a case in which the image display signal has been stored in the first storage region 25*a*, a flag is raised in the second storage region 25*b*. Here, the term "raising a flag." means that, for example, a "flag field" for an image display signal is set in the second storage region 25*b* and the value of the "flag field" is set to "1". In a case in which the value of the "flag field" is "0", no image display signal has been stored in the first storage region 25*a*. As such, the recording information indicating whether the image display signal has been stored can be represented by one bit of "0" or "1".

For the value of the "flag field" for an image display signal, in a case in which the image display signal has been transmitted and stored in the first storage region 25*a*, after the image display signal is transmitted, a write signal for changing the recording information to indicate that the image display signal has been stored is transmitted from the writing unit 34 of the reader/writer 14 to the display control unit 24*a* of the tag 12 through the contact electrode unit 30 and the signal receiving unit 20. In a case in which the display control unit 24*a* receives the write signal, the display control unit 24*a* sets the value of the "flag field" for an image display signal in the second storage region 25*b* to "1". In this way, in the tag 12, the image display signal is in a stored state.

The reader/writer 14 reads the value of the "flag field" for an image display signal in the second storage region 25*b* of the tag 12. In a case in which the value of the "flag field" for an image display signal is "1", the reader/writer 14 can detect that the image display signal has been stored in the tag 12.

In this embodiment, the value of the "flag field" for an image display signal is "1" in a case in which the image display signal has been stored. However, the invention is not limited thereto as long as it can be detected that the image display signal has been stored. The value of the "flag field" for an image display signal indicating that the image display signal has been stored may be "0".

In the image-memory-type display medium 24, an image display signal is input to the display control unit 24*a* and the display image 28 is displayed on the display unit 24*b* on the basis of the image display signal. The display image 28 is displayed on the basis of the image display signal and includes characters and symbols, in addition to an image. Examples of the display image 28 include a user, an owner, an article name, and a price.

In a case in which the image-memory-type display medium 24 does not include a power supply unit, such as a battery, a direct current signal or an alternating current signal with a predetermined voltage for driving the display control unit 24*a* is supplied through the signal receiving unit 20.

The tag 12 indicates the information of the object having the tag 12 attached thereto as described above. It is preferable that the display image 28 is not capable of being rewritten to the image-memory-type display medium 24 in order to prevent an error in display. It is preferable that the image display signal is not written to the first storage region 25*a* two times. In addition, the image displayed on the electronic paper is likely to be removed over time or due to, for example, static electricity. In this case, an error in display occurs.

For this reason, the image-memory-type display medium 24 is preferably an electronic paper to which information is written only once, that is, a so-called write-once electronic paper. For example, the write-once electronic paper has a structure in which a flag is raised in the second storage region 25*b* of the storage unit 24*c* in the image-memory-type display medium 24 and an image display signal for the display image 28 is written to the first storage region 25*a* only once, that is, the image display signal is stored only once. In this way, it is possible to prevent the image display signal from being transmitted from the reader/writer 14.

In a case in which the reader/writer 14 does not detect the flag in the second storage region 25*b*, the reader/writer 14 is likely to transmit the image display signal and the image display signal is likely to be rewritten or two image display signals are likely to be mixed. For this reason, preferably, the image display signal can be stored in at least the first storage region 25*a* in which the image display signal is stored in the storage unit 24*c* only once and is not rewritable, that is, irreversible. As a method in which the image display signal can be stored only once and is not capable of being rewritten, the image display signal may not be rewritten in a system in which the image display signal can be rewritten or a display medium to which the image display signal is not capable of being physically rewritten may be used.

For example, the following types of electronic papers can be used: a microcapsule type; an electrophoresis type; a liquid crystal type; an electronic liquid powder type; an electrowetting type; a chemical change type; and a heat-sensitive material type. A liquid crystal display device may be used as the image-memory-type display medium 24.

Figure 7:
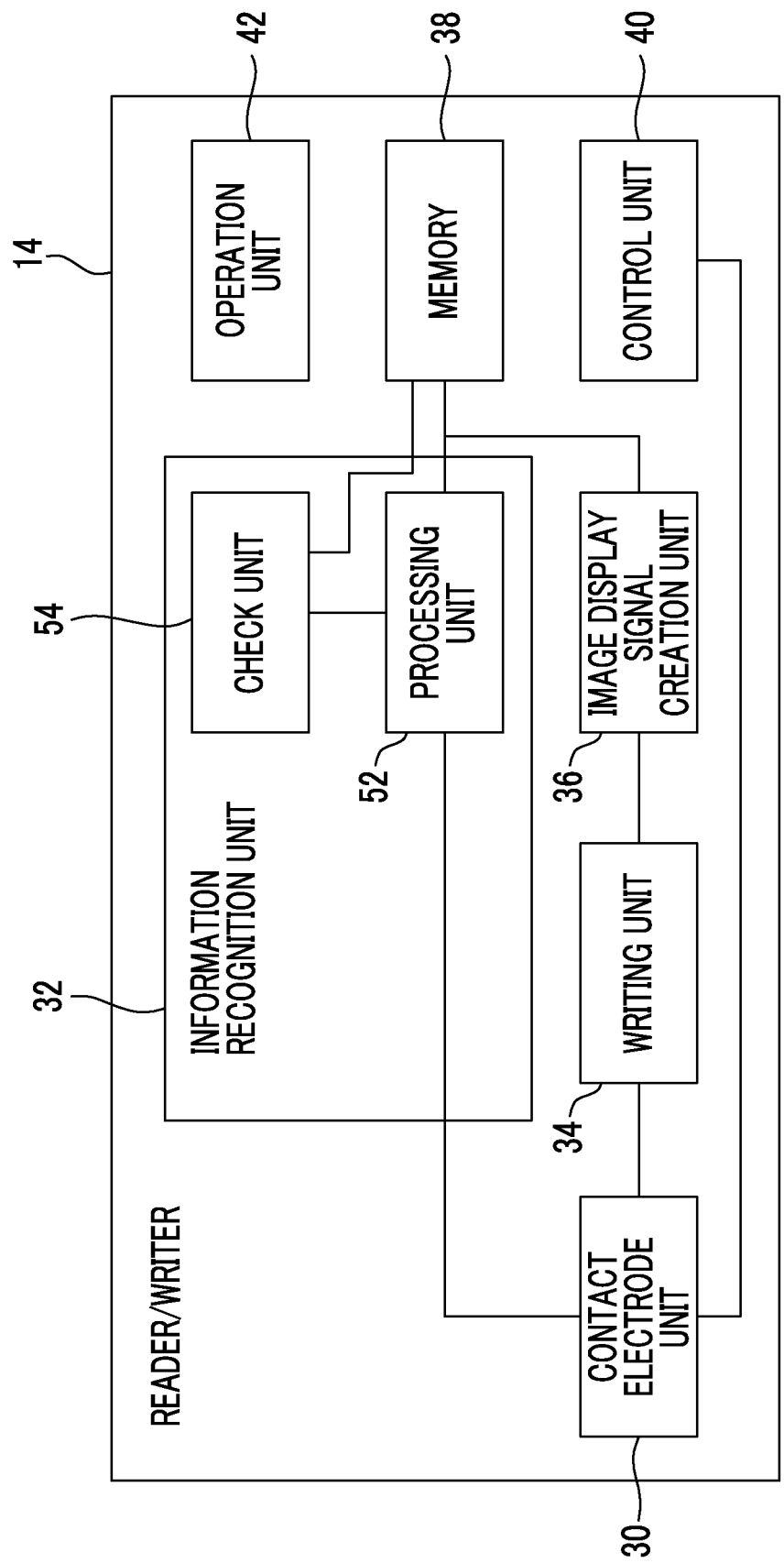
FIG. 7 is a block diagram illustrating the configuration of a reader/writer of the information display system according to the embodiment of the invention.

FIG. 7 is a block diagram illustrating the configuration of the reader/writer in the information display system according to the embodiment of the invention. In the reader/writer 14, the configuration illustrated in FIG. 7 is accommodated in a housing 18 (see FIG. 1).

The reader/writer 14 includes a contact electrode unit 30, an information recognition unit 32, a writing unit 34, an image display signal creation unit 36, a memory 38, a control unit 40, and an operation unit 42. In the reader/writer 14, the control unit 40 controls the operation of the contact electrode unit 30, the information recognition unit 32, the writing unit 34, the image display signal creation unit 36, and the memory 38 and the transmission and reception of data between these components.

The operation unit 42 is used to input a command to the reader/writer 14 by the user of the reader/writer 14. A command input through the operation unit 42 is input to the control unit 40 and the reader/writer 14 performs an operation corresponding to the input command. The operation unit 42 can have any configuration as long as it can input a command. For example, a display unit, an operation button, or a touch sensor used to input a command can be appropriately used as the operation unit 42. In addition, the operation unit 42 may generate sounds. In this case, it is possible to generate warning sounds.

The contact electrode unit 30 comes into contact with the signal receiving unit 20 and is a contact with the tag 12. The contact electrode unit 30 has the same configuration as the signal receiving unit 20. For example, the contact electrode unit 30 includes an electrode having the same configuration as the electrode 21 (see FIG. 2) of the signal receiving unit 20 (see FIG. 2), which is not illustrated in the drawings.

The control unit 40 monitors the electrical connection of the contact electrode unit 30. In a case in which the contact electrode unit 30 comes into contact with the signal receiving unit 20 and is electrically connected thereto, the information recognition unit 32 reads the identification information of the tag 12 and reads the value of the "flag field" in the second storage region 25b of the storage unit 24c of the tag 12. The contact of the contact electrode unit 30 with the signal receiving unit 20 is a trigger on the operation of the reader/writer 14. For example, the electrical connection can be detected by a change in the resistance value of the contact electrode unit 30.

The information recognition unit 32 reads the identification information of the tag 12 and reads the value of the "flag field" in the second storage region 25b of the storage unit 24c of the tag 12. The information recognition unit 32 may have any configuration as long as it can perform these processes. For example, the information recognition unit 32 includes a processing unit 52 and a check unit 54.

The processing unit 52 is connected to the contact electrode unit 30. The processing unit 52 processes the read signal of the identification information obtained by the contact electrode unit 30. For example, the processing unit 52 converts the read signal into a digital signal and obtains read data. The processing unit 52 can perform a decoding process for the read data and compare the read identification information with the identification information stored in the memory 38. The read data of the identification information subjected to the decoding process is output to the check unit 54. Then, the check unit 54 can compare the identification information of the tag 12 with the identification information stored in the memory 38 and check whether the identification information is identical to the stored identification information, which will be described below.

In addition, for information about the value of the "flag field" in the second storage region 25b of the storage unit 24c of the tag 12 obtained through the contact electrode unit 30, the processing unit 52 processes the read signal of the identification information. For example, the processing unit 52 converts the read signal into a digital signal and obtains read data. The read data of the digital signal is output to the check unit 54. Then, the check unit 54 can perform a process based on the value of the "flag field" in the second storage region 25b, which will be described below. All of the read data obtained by the processing unit 52 may be output and stored in the memory 38.

The check unit 54 compares the identification information obtained by the information recognition unit 32 with the identification information stored in the memory 38 and determines whether the identification information obtained by the information recognition unit 32 is identical to the identification information stored in the memory 38. In this way, it is possible to prevent an error in display on the tag 12.

Specifically, in a case in which the identification information of the read tag 12 is not identical to the identification information stored in the memory 38, that is, in a case in which a different tag is read, the control unit 40 stops the process of the reader/writer 14. Therefore, even in a case in which a different tag is included in a plurality of tags, it is possible to prevent the display image from being written to the different tag. In this case, a warning may be issued to the operation unit 42 by, for example, an image or sounds. In this way, it is possible to inform the user of the different tag.

In a case in which the identification information of the read tag 12 is identical to the identification information stored in the memory 38, the process of the reader/writer 14 is continuously performed.

The check unit 54 obtains information about the value of the "flag field" in the second storage region 25b of the storage unit 24c of the tag 12. In a case in which the value of the "flag field" is "1", the control unit 40 stops the process of the reader/writer 14 since the image display signal has already been stored. In this case, a warning may be issued to the operation unit 42 by, for example, an image or sounds.

On the other hand, in a case in which the value of the "flag field" is "0", the process of the reader/writer 14 is continuously performed since the image display signal has not been transmitted.

The reader/writer 14 processes the value of the "flag field" before processing the identification information. In a case in which the identification information is processed first and the value of the "flag field" is "1", that is, the image display signal has already been stored, the process is stopped even when the identification information items are identical to each other. Therefore, it is preferable that the value of the "flag field" is processed first in order to simplify processes in a case in which the process is stopped.

The writing unit 34 transmits the image display signal for displaying the display image 28 on the image-memory-type display medium 24 from the contact electrode unit 30 to the tag 12. In addition, the writing unit 34 transmits the write signal from the contact electrode unit 30 to the tag 12.

The image display signal creation unit 36 creates an image display signal. For example, the image display signal creation unit 36 creates the image display signal on the basis of image display information corresponding to the identification information stored in the memory 38. The image display signal is used to form a display image indicating, for example, the owner of an object, the user of the object, the name of the object, the price of the object, and the expiration date of the object.

The image display signal creation unit 36 creates the image display signal from the image display information corresponding to the identification information stored in the memory 38. The image display signal is transmitted from the writing unit 34 at the time which will be described below.

In addition, the image display signal creation unit 36 creates a write signal for changing the recording information to indicate that the image display signal has been stored. The write signal is, for example, a signal for changing the value of the "flag field" for an image display signal provided in the second storage region 25b to "1".

The write signal may be stored in the memory 38 in advance. In this case, the image display signal creation unit 36 reads the write signal from the memory 38 and the writing unit 34 transmits the write signal to the tag 12 after transmitting the image display signal. Then, the display control unit 24a sets the value of the "flag field" for an image display signal in the second storage region 25b to "1".

In a case in which the image-memory-type display medium 24 does not have a power supply unit, such as a battery, is supplied with power from the reader/writer 14, and displays the display image 28 on the display unit 24b, the reader/writer 14 includes a power supply unit for supplying power to the image-memory-type display medium 24. The power supply unit includes, for example, the image display signal creation unit 36 and the writing unit 34. In this case, the image display signal creation unit 36 does not create the image display signal, generates a direct current signal or an alternating current signal with a predetermined voltage for driving the display control unit 24a, and the writing unit 34 transmits the direct current signal or the alternating current signal, instead of the image display signal.

The memory 38 stores various kinds of information. The memory 38 stores image display information corresponding to the identification information. The image display information is, for example, information about an owner, a user, an article name, a price, an expiration date, and the place of origin.

In addition, the memory 38 stores identification information for comparison with the identification information obtained by the information recognition unit 32. As described above, in a case in which the identification information obtained by the information recognition unit 32 is not identical to the identification information stored in the memory 38, a display image is not written and miswriting is prevented.

In addition, various kinds of information including the identification information stored in the memory 38 may be rewritten according to, for example, the purpose of use. A rewriting method may be a method that changes a recording medium of the memory 38 or a rewriting method through a wired or wireless communication line.

FIG. 8 is a flowchart illustrating the flow of an example of a display image writing process performed by the information display system according to the embodiment of the invention.

An example in which the tag 12 is attached to the container 16a as illustrated in FIG. 3 and the display image 28 of the information of the user of the container 16a, for example, the name of the user is displayed on the tag 12 on the basis of the identification information of the tag 12 will be described. In this case, for example, an error in the writing of the name of a patient to the tag 12 is prevented and it is possible to prevent an error in injection in a case in which a liquid medicine is injected into the patient.

The contact electrode unit 30 of the reader/writer 14 is brought into contact with the signal receiving unit 20 of the tag 12 (Step S10). In this case, the control unit 40 detects the electrical connection of the contact electrode unit 30 and the information recognition unit 32 reads recording information, that is, the value of the "flag field" in the second storage region 25b of the storage unit 24c of the tag 12, using the detection of the electrical connection as a trigger (Step S12). In addition, the information recognition unit 32 reads the identification information in the first storage region 25a (Step S12). The processing unit 52 and the check unit 54 of the information recognition unit 32 obtain the value of the "flag field" and the identification information.

In Step S12, the value of the "flag field" and the identification information are read. However, in a case in which the image display signal has been stored, the process is stopped. Therefore, of the value of the "flag field" and the identification information, at least the value of the "flag field" may be read in order to prevent the execution of an unnecessary process.

Then, it is determined whether the image display signal has been stored in the first storage region 25a on the basis of the value of the "flag field" (Step S14).

In a case in which the value of the "flag field" is "1" in Step S14, the image display signal has already been stored in the first storage region 25a. In this case, the control unit 40 stops the process of the reader/writer 14 and the display image 28 is not written to the tag 12. In this case, for example, a warning may be issued to inform the user of the reader/writer 14 that the image display signal has been stored in the tag.

On the other hand, in a case in which the value of the "flag field" is "0" in Step S14, the image display signal has not been stored in the first storage region 25a. In this case, the check unit 54 of the information recognition unit 32 checks whether the identification information of the read tag 12 is identical to the identification information stored in the memory 38 (Step S16).

In a case in which the identification information of the read tag 12 is not identical to the stored identification information in Step S16, the process of the reader/writer 14 is stopped and the display image 28 is not written to the tag 12. In this case, for example, a warning may be issued to inform the user of the reader/writer 14 of a different tag.

On the other hand, in a case in which the identification information of the read tag 12 is identical to the stored identification information in Step S16, the image display signal creation unit 36 creates an image display signal and the image display signal is transmitted from the writing unit 34 to the display control unit 24a of the image-memory-type display medium 24 through the contact electrode unit 30 and the signal receiving unit 20 of the tag 12 and is stored in the first storage region 25a (Step S18). Then, the display image 28 is displayed on the display unit 24b on the basis of the transmitted image display signal.

Then, after the image display signal is transmitted in Step S18, the image display signal is stored in the first storage region 25a. After the image display signal is transmitted, a write signal indicating that the image display signal has been transmitted is transmitted (Step S20). In this case, the write signal is transmitted to the display control unit 24a of the tag 12 through the contact electrode unit 30 and the display control unit 24a sets the value of the "flag field" in the second storage region 25b of the storage unit 24c to "1". Then, in the tag 12, the recording information indicates that the image display signal has been stored. In the reader/writer 14, the transmission of the image display signal is prevented and the image display signal is prevented from being written two times.

As described above, it is determined whether the image display signal has been stored in the tag 12 on the basis of the recording information before the process of determining whether the identification information items are identical to each other. Therefore, it is possible to quickly determine whether the image display signal has been recorded and to reliably prevent the image display signal from being written two times, without performing an unnecessary process. As a result, it is possible to remove a tag which is not an image display target in a short time.

In addition, for example, in a case in which the name of the user that a medicine is administered to is stored in the memory 38 of the reader/writer 14 so as to correspond to the identification information of the tag 12, the name of a patient is displayed on the tag 12 of the medicine to be administered to the patient which has the identical identification information. In contrast, for a medicine that is not administered to the patient, since identification information items are not identical to each other, the name of the patient is not displayed on the tag 12. In this way, it is possible to prevent an error in writing to a medicine.

In the above-mentioned example, in Step S16, the identification information of the read tag 12 is compared with the identification information stored in the memory 38. However, the invention is not limited thereto. For example, the object to be subjected to the identification information check process may be predetermined. Specifically, before Step S10, target identification information is acquired and stored in the memory 38. For example, as a method for acquiring the target identification information, the reader/writer 14 reads a bar code and the target identification information is stored in the memory 38. In this state, the process is performed from Step S10. In this way, it is possible to reduce the amount of identification information to be compared.

In the information display system 10, the display image 28 is obtained by a contact system in which the tag 12 and the reader/writer 14 come into contact with each other. Therefore, a display image is prevented from being written to another tag with which the reader/writer 14 does not come into contact, unlike a wireless system. In addition, for the tag 12, the information of another tag with which the reader/writer 14 does not come into contact is prevented from being read. Therefore, it is possible to prevent an error in the writing of the display image 28 to the tag 12. For example, in a case in which the information display system 10 is used to administer a medicine, a medicine name can be identical to a patient and it is possible to prevent an error in the administration of medicines.

As described above, in the contact system, the configuration of the tag 12 can be simpler than that of the wireless system requiring, for example, a receiving circuit. In addition, for example, since a bar code is not provided, it is possible to reduce the costs of the tag 12. Therefore, it is possible to manufacture a disposable tag 12.

The invention basically has the above-mentioned configuration. The information display system according to the invention has been described in detail above. However, the invention is not limited to the above-described embodiment and various modifications and changes of the invention can be made without departing from the scope and spirit of the invention.

EXPLANATION OF REFERENCES

- 10: information display system
- 12: tag
- 14: reader/writer
- 16a: container
- 16b: cylindrical container
- 16c: sheet
- 18: housing
- 20: signal receiving unit
- 21: electrode
- 24: image-memory-type display medium
- 24a: display control unit
- 24b: display unit
- 24c: storage unit
- 25a: first storage region
- 25b: second storage region
- 26: sheet body
- 28: display image
- 30: contact electrode unit
- 32: information recognition unit
- 34: writing unit
- 36: image display signal creation unit
- 38: memory
- 40: control unit
- 42: operation unit
- 52: processing unit
- 54: check unit
- S10: step
- S12: step
- S14: step
- S16: step
- S18: step
- S20: step

What is claimed is:

1. An information display system comprising:
a tag comprising a signal receiving unit, an image-memory-type display medium that displays a display image on the basis of an image display signal, and a storage unit including a first storage region in which identification information and the image display signal are stored and a second storage region in which recording information indicating a storage state of the image display signal in the first storage region is stored; and
a reader/writer comprising a contact electrode unit that comes into contact with the signal receiving unit, an information recognition unit that reads from the tag the identification information stored in the first storage region and the recording information stored in the second storage region, a memory that stores identification information and image display information corresponding to the identification information, and a writing unit that transmits to the image-memory-type display medium an image display signal based on the image display information and a write signal for changing the recording information to indicate that the image display signal has been stored through the contact electrode unit,
wherein, in a case in which the contact electrode unit of the reader/writer comes into contact with the signal receiving unit of the tag, the reader/writer reads at least the recording information of the identification information and the recording information,
in a case in which the image display signal has not been stored, the reader/writer compares the identification information read by the information recognition unit with the identification information stored in the memory, and
in a case in which the identification information read by the information recognition unit is identical to the identification information stored in the memory, the writing unit transmits the image display signal based on the image display information corresponding to the identification information stored in the memory through the contact electrode unit such that the display image is displayed on the image-memory-type display medium and transmits the write signal.

2. The information display system according to claim 1, wherein the first storage region of the storage unit of the tag is capable of storing the image display signal for the display image only once.

3. The information display system according to claim 2, wherein the storage unit of the tag is non-volatile.

4. The information display system according to claim 3, wherein the image-memory-type display medium includes a display unit that displays the display image and a display control unit that makes the display unit display the display image on the basis of the image display signal transmitted from the reader/writer,
wherein the display control unit is driven be being supplied with a direct current signal or an alternating current signal with a predetermined voltage, and
wherein the reader/writer includes a power supply unit that supplies the direct current signal or the alternating current signal with the predetermined voltage to the display control unit of the image-memory-type display medium.

5. The information display system according to claim 2,
wherein the image-memory-type display medium includes a display unit that displays the display image and a display control unit that makes the display unit display the display image on the basis of the image display signal transmitted from the reader/writer, wherein the display control unit is driven be being supplied with a direct current signal or an alternating current signal with a predetermined voltage, and wherein the reader/writer includes a power supply unit that supplies the direct current signal or the alternating current signal with the predetermined voltage to the display control unit of the image-memory-type display medium.

6. The information display system according to claim 1, wherein the storage unit of the tag is non-volatile.

7. The information display system according to claim 6,
wherein the image-memory-type display medium includes a display unit that displays the display image and a display control unit that makes the display unit display the display image on the basis of the image display signal transmitted from the reader/writer, wherein the display control unit is driven be being supplied with a direct current signal or an alternating current signal with a predetermined voltage, and wherein the reader/writer includes a power supply unit that supplies the direct current signal or the alternating current signal with the predetermined voltage to the display control unit of the image-memory-type display medium.

8. The information display system according to claim 1,
wherein the image-memory-type display medium includes a display unit that displays the display image and a display control unit that makes the display unit display the display image on the basis of the image display signal transmitted from the reader/writer, wherein the display control unit is driven be being supplied with a direct current signal or an alternating current signal with a predetermined voltage, and wherein the reader/writer includes a power supply unit that supplies the direct current signal or the alternating current signal with the predetermined voltage to the display control unit of the image-memory-type display medium.

* * * * *